United States Patent [19]

March

[11] Patent Number: 5,722,802
[45] Date of Patent: Mar. 3, 1998

[54] POWDER DELIVERY APPARATUS

[75] Inventor: Timothy Wayne March, Westland, Mich.

[73] Assignee: Low Emission Paint Consortium, Southfield, Mich.

[21] Appl. No.: 486,466

[22] Filed: Jun. 9, 1995

[51] Int. Cl.⁶ .......................... B65G 53/18; B65G 69/06
[52] U.S. Cl. ............ 406/46; 134/102.2; 138/114; 138/DIG. 3; 222/195; 239/427.3; 406/89
[58] Field of Search ........................ 137/237, 238, 137/240, 375; 134/102.2; 222/195; 239/427.3; 406/46, 47, 48, 86, 89, 91, 136, 137, 138; 138/111, 114, DIG. 3

[56] References Cited

U.S. PATENT DOCUMENTS

| | | | |
|---|---|---|---|
| 2,527,466 | 10/1950 | Townsend et al. | 406/89 |
| 3,040,760 | 6/1962 | Macks | 406/46 |
| 3,709,434 | 1/1973 | Gebhardt et al. | 239/427.3 |
| 3,844,622 | 10/1974 | Bingham | 406/89 |
| 4,116,491 | 9/1978 | Ply | 406/89 |
| 4,220,426 | 9/1980 | Ply | 406/89 |
| 4,787,921 | 11/1988 | Shibata et al. | 55/159 |
| 4,925,710 | 5/1990 | Buck et al. | 428/34.5 |
| 5,129,766 | 7/1992 | Dirkse et al. | 222/195 |
| 5,170,011 | 12/1992 | Martucci | 174/47 |
| 5,188,296 | 2/1993 | Duez | 239/427.3 |
| 5,193,942 | 3/1993 | Berry et al. | 406/46 |
| 5,195,680 | 3/1993 | Holt | 239/124 |
| 5,335,828 | 8/1994 | Kaiju et al. | 222/195 |

FOREIGN PATENT DOCUMENTS

| | | | |
|---|---|---|---|
| 0229719 | 10/1986 | Japan | 406/86 |
| 347477 | 8/1960 | Switzerland | 406/89 |
| 1055674 | 1/1967 | United Kingdom | 406/89 |

*Primary Examiner*—George L. Walton
*Attorney, Agent, or Firm*—Damian Porcari; Roger L. May

[57] ABSTRACT

A powder delivery apparatus for use in a paint supply system. The apparatus has a flexible inner hose having an innermost and outermost surface with pores extending therebetween. The innermost surface defines a channel along which powder particles may flow. Surrounding and extending coaxially with the inner hose is a flexible outer hose. The innermost surface of the flexible outer hose and the outermost surface of the inner hose define an annular path that is charged with air. The air is forced under pressure radially inwardly through the pores to the inner hose so that during powder flow, powder particles are atomized and prevented from fusing to the innermost surface of the inner hose. Thus, powder build-up and impact fusion are avoided in the inner hose. Accordingly, consistent powder flow rates and supply pressures are promoted.

**8 Claims, 1 Dr

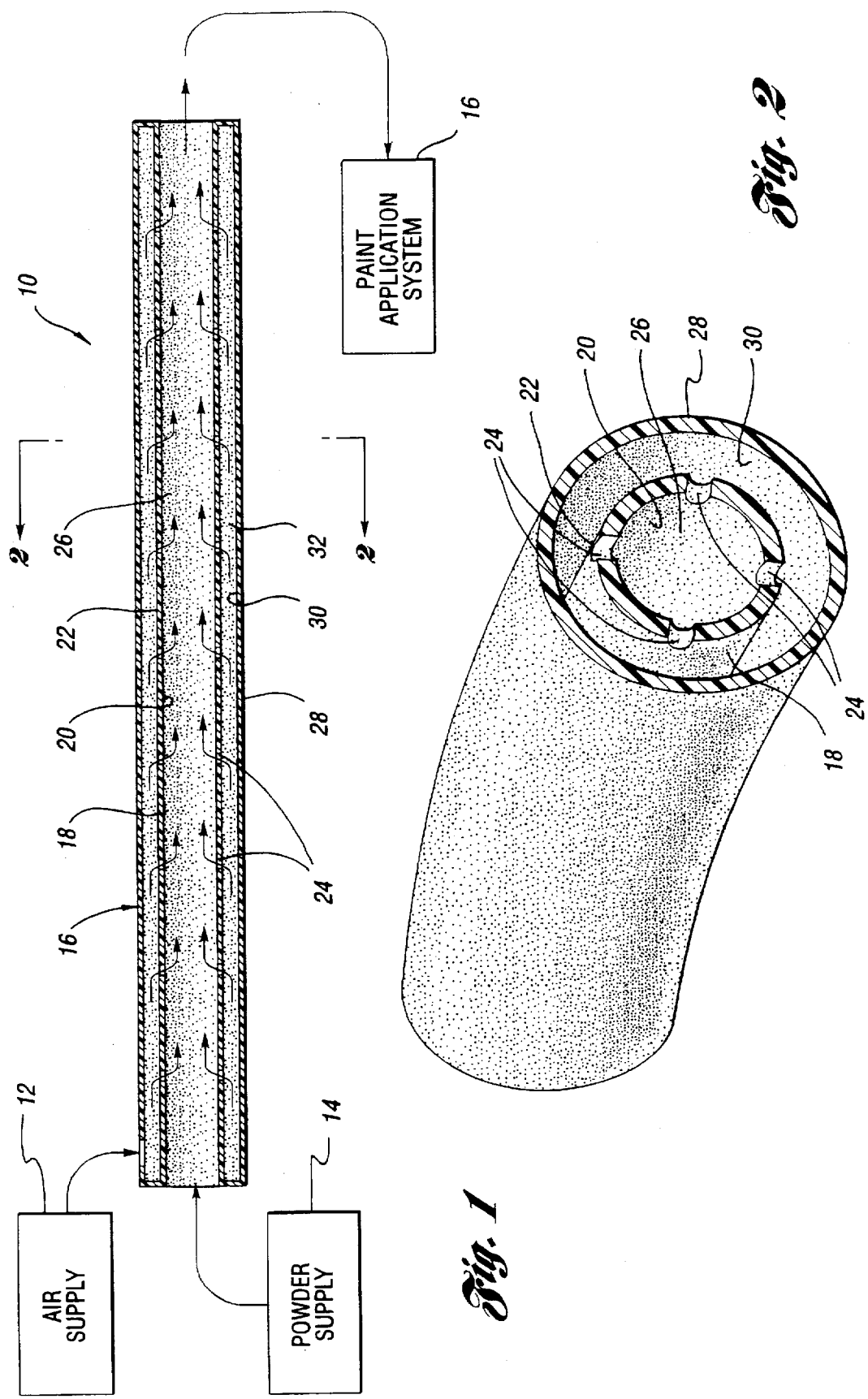

POWDER DELIVERY APPARATUS

TECHNICAL FIELD

The present invention relates to a powder delivery apparatus for use in a paint supply system.

BACKGROUND ART

Conventional paint supply systems of the types in widespread commercial use often involve the problems of maintaining pigments suspended in a fluid coating composition in order to allow consistency in the quality and color of a paint layer applied to an object to be painted. The transporting of powder, however, as in powder paint systems, poses different problems.

Illustrative is U.S. Pat. No. 5,195,680 which discloses a coaxial paint hose and supply system. The '680 reference teaches a flexible coaxial conduit connected between a spray nozzle and supply and return conduits of a recirculating paint supply system.

Prior approaches, however, often fail to provide consistent powder flow characteristics caused by the varying effects resulting from powder build-up in a delivery hose. Typically, powder and air are not ideally mixed in the traditional transport hoses. This causes a "roping" phenomenon in which the powder concentration spirals through the hose and is not evenly distributed through a cross section of the hose. Ideally, to improve film build control and uniformity, consistent and controllable flow rates and supply pressures are required. Such systems also require that the delivery hose be purged on a relatively frequent basis in order to reduce or eliminate initial surges of un-atomized powder that occur when a hose is not purged. Such build-ups may tend to occur as a result of impact between the paint powder and an inner wall of the delivery hose.

SUMMARY OF THE INVENTION

It is an object of the present invention to promote thorough mixing of the powder and air stream in a paint delivery system to enhance "atomization" of the powder.

It is also an object of the invention to improve film build uniformity and transfer efficiency.

It is another object of the invention to provide a lower air pressure to transport powder, thereby lowering particle velocity and enhancing transfer efficiency.

The present invention discloses a powder delivery apparatus for use in a paint supply system. The apparatus comprises a flexible inner hose having an innermost and outermost surface with pores extending therebetween. The innermost surface defines a channel along which powder particles may flow.

Surrounding and extending coaxially with the inner hose is a flexible outer hose. The innermost surface of the flexible outer hose and the outermost surface of the inner hose define an annular path that is charged with air.

The air is forced under pressure radially inwardly through the pores so that during powder flow, powder particles are prevented from fusing to the innermost surface of the inner hose. Thus, powder build-up and impact fusion are avoided in the innermost hose. Accordingly, consistent powder flow rates and supply pressures are promoted.

Under the present invention, consistent powder flow rates and supply pressures are achieved, together with improved atomization or break-up of the powder/air mixture.

BRIEF DESCRIPTION OF THE DRAWINGS

FIG. 1 is a schematic representation, partially cross-sectioned, of a powder delivery apparatus according to the present invention; and FIG. 2 is a sectional view of the powder delivery apparatus taken along the line 2—2 of FIG. 1.

DETAILED DESCRIPTION OF THE PREFERRED EMBODIMENTS

Turning to FIGS. 1-2 of the drawings, there is depicted a powder delivery apparatus 10 which communicates at an upstream end with an air supply 12 and powder supply 14 including a conveying fluid and at a downstream end with a paint application system 16.

The powder delivery apparatus 10 comprises a flexible inner hose 18 having an innermost surface 20 and an outermost surface 22. Pores 24 extend between the innermost and outermost surfaces 22 of the flexible inner hose 18. Powder particles may flow along a channel 26 which is defined by the innermost surface 20.

Surrounding and extending coaxially with the inner hose 18 is a flexible outer hose 28 which is provided with an innermost surface 30. The innermost surface 30 and the outermost surface 22 of the inner hose define an annular chamber 32 that is charged with air.

The air is forced under pressure from the chamber 32 radially inwardly through the pores. During powder flow, powder particles are prevented from fusing to the innermost surface 20 of the inner hose 18. Thus, powder build-up and impact fusion in the inner hose are avoided. Accordingly, consistent powder flow rates and supply pressures are promoted.

Preferably, the inner hose 18 comprises a sintered compound in which sub-micron pores 24 are defined. The pores permit injection of air into and atomization of the powder. Thus, laminar flow of the powder along the innermost surface 30 of the outer hose 28 is destroyed and atomization is improved, thereby promoting transfer efficiency.

The sintered material is made by heat or pressure compression of beads of material having an average diameter of 20–30 microns. If desired, the tube surfaces can be coated with "TEFLON" spray or an equivalent material to enhance performance.

It will be appreciated that FIG. 2 is not drawn to scale. In fact, the average pore diameter is less than 1 micron, and the inner hose may include millions of pores.

One of the benefits of the present invention is to promote thorough mixing of the powder and air stream. Enhanced "atomization of the powder" leads to improved film build uniformity and transfer efficiency. In part, efficiency is achieved due to lower air pressures which are required to transport the powder. In turn, particle velocity is reduced while being more evenly distributed. Lower particle velocity and better atomization will promote transfer efficiency because (1) the particles will have a longer "dwell time" in a corona electrostatic field (as well as being evenly distributed in the field), and (2) the lower velocities will have less of a tendency to propel powder particles past the substrate.

It will be clear to those skilled in the art of powder delivery apparatus that various modifications and changes could be made to the assembly described without departing from the spirit and scope of this invention. Accordingly, all such modifications and changes as fall within the scope of the appended claims are intended to be part of this invention.

What is claimed is:

1. A powder delivery apparatus for use in a paint supply system for conveying paint powder particles, comprising:

an inner hose having an innermost and outermost surface and pores extending therebetween, the innermost surface defining a channel along which paint powder particles may flow; a conveying fluid entraining the paint powder particles for conveying the paint powder particles along the channel and an outer concentric hose having an innermost surface spaced apart from the inner hose, the innermost surface of the outer hose and the outermost surface of the inner hose defining an uninterrupted annular chamber that is charged with a low pressure air, the air being forced under pressure from the chamber radially inwardly through the pores and between the powder particles, so that transfer efficiency of the powder particles is achieved due to lower air pressures which are required to transport the powder particles, and in turn, particle velocity is reduced while being more evenly distributed along the interior of the inner hose, thereby promoting atomization and destroying agglomeration of adjacent particles so powder particles are prevented from fusing to the innermost surface of the inner hose, thus avoiding powder build-up in the inner hose and promoting consistent powder flow rates and supply pressures.

2. The powder delivery apparatus of claim 1, wherein the inner hose comprises a sintered material, the pores permitting injection of air into the inner hose and atomization of the powder, and destroying laminar flow along the innermost surface of the inner hose, thereby promoting transfer efficiency.

3. The powder delivery apparatus of claim 1, wherein the inner hose is flexible.

4. The powder delivery apparatus of claim 1, wherein the outer hose is flexible.

5. The powder delivery apparatus of claim 1, wherein the chamber is annular.

6. The powder delivery apparatus of claim 1, wherein the pores have an average diameter of less than 1 micron.

7. The powder delivery apparatus of claim 1, further comprising a protective coating applied to the surfaces of the inner and outer hoses to enhance performance.

8. The powder delivery apparatus of claim 1, wherein the protective coating comprises "TEFLON."

* * * * *